Oct. 27, 1964 R. P. KNAPP 3,154,039
STABLE FLOATING FOUNDATION
Filed July 25, 1962 8 Sheets-Sheet 3
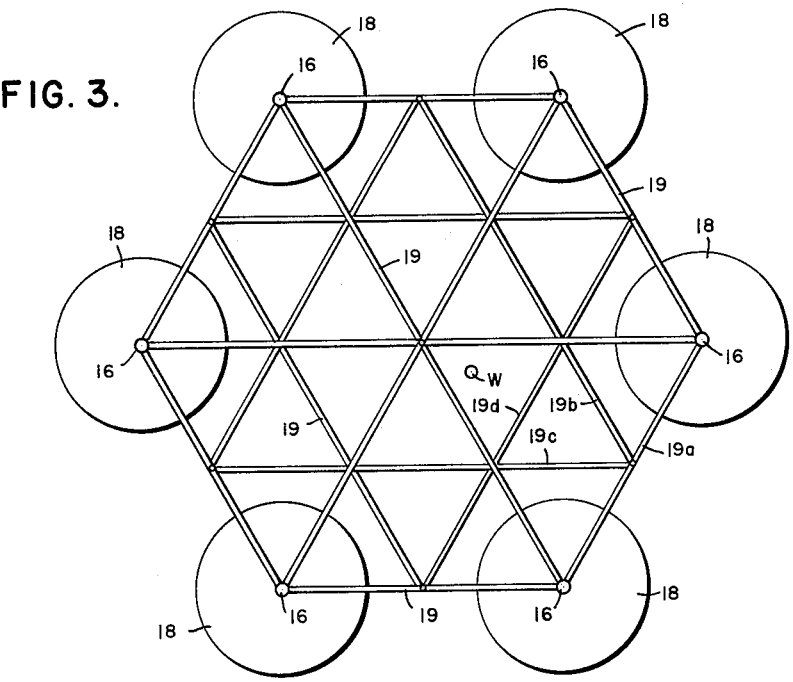
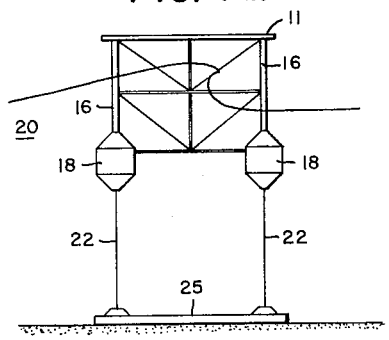
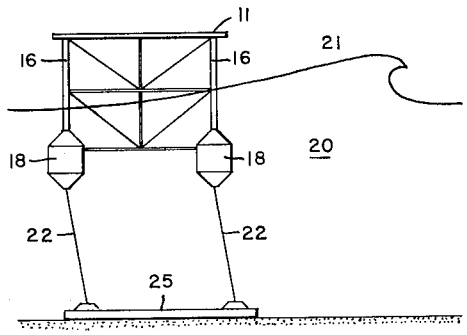
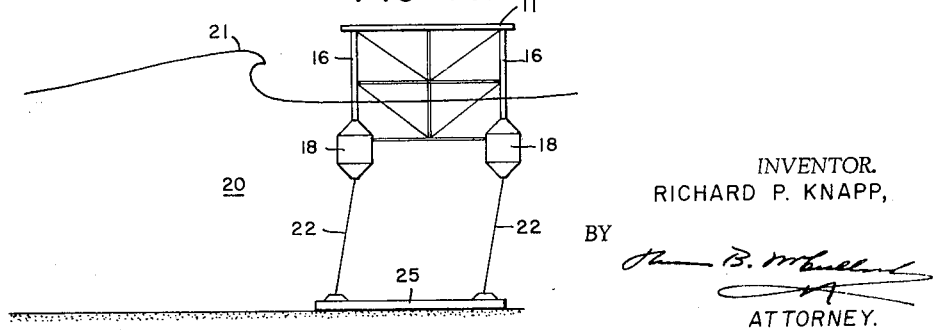
INVENTOR.
RICHARD P. KNAPP,
BY
ATTORNEY.

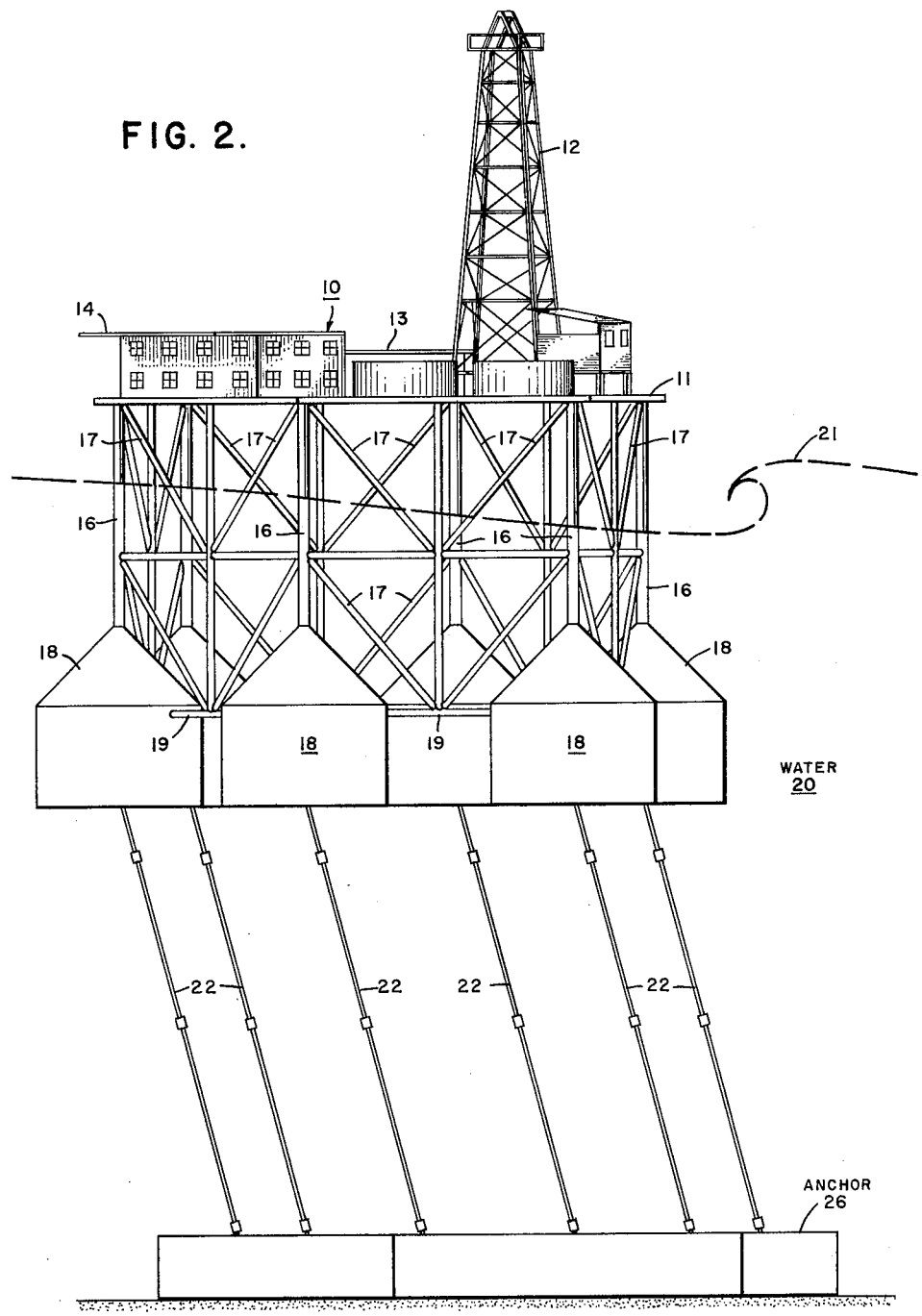

Oct. 27, 1964

R. P. KNAPP 3,154,039

STABLE FLOATING FOUNDATION

Filed July 25, 1962

INVENTOR.
RICHARD P. KNAPP,
BY
*Thomas B. McMullen*
ATTORNEY.

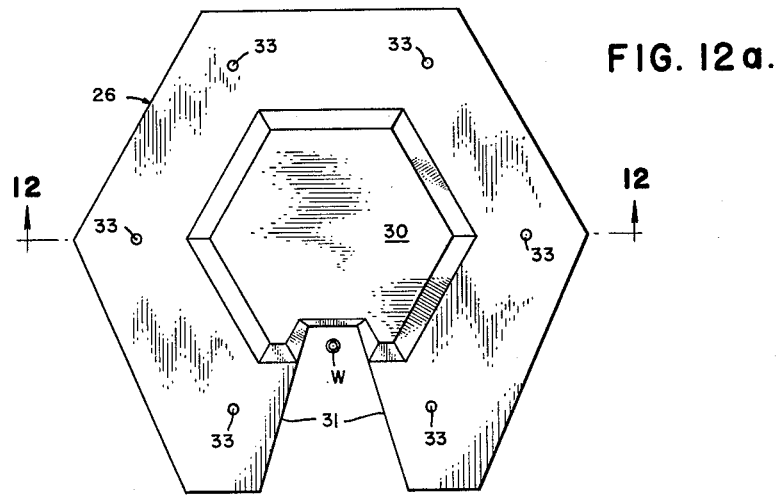
FIG. 12a.
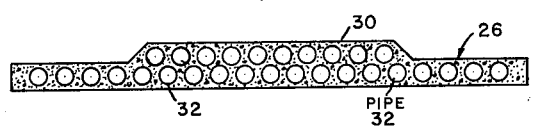
FIG. 12b.
FIG. 13a.
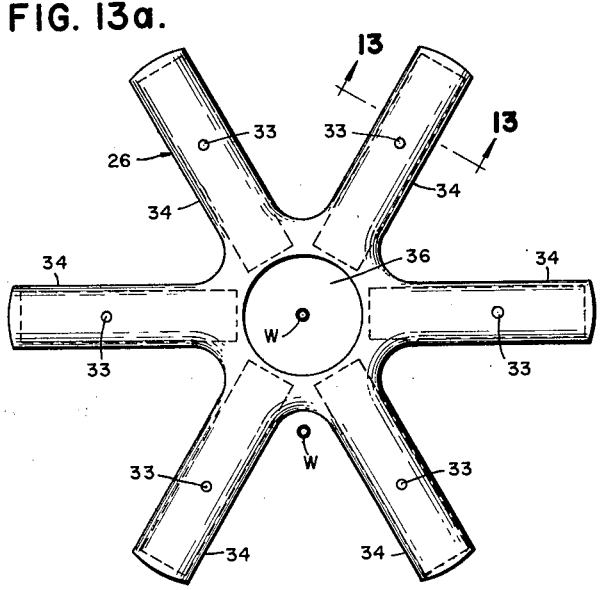
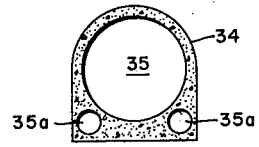
FIG. 13b.
INVENTOR.
RICHARD P. KNAPP,
BY
ATTORNEY.

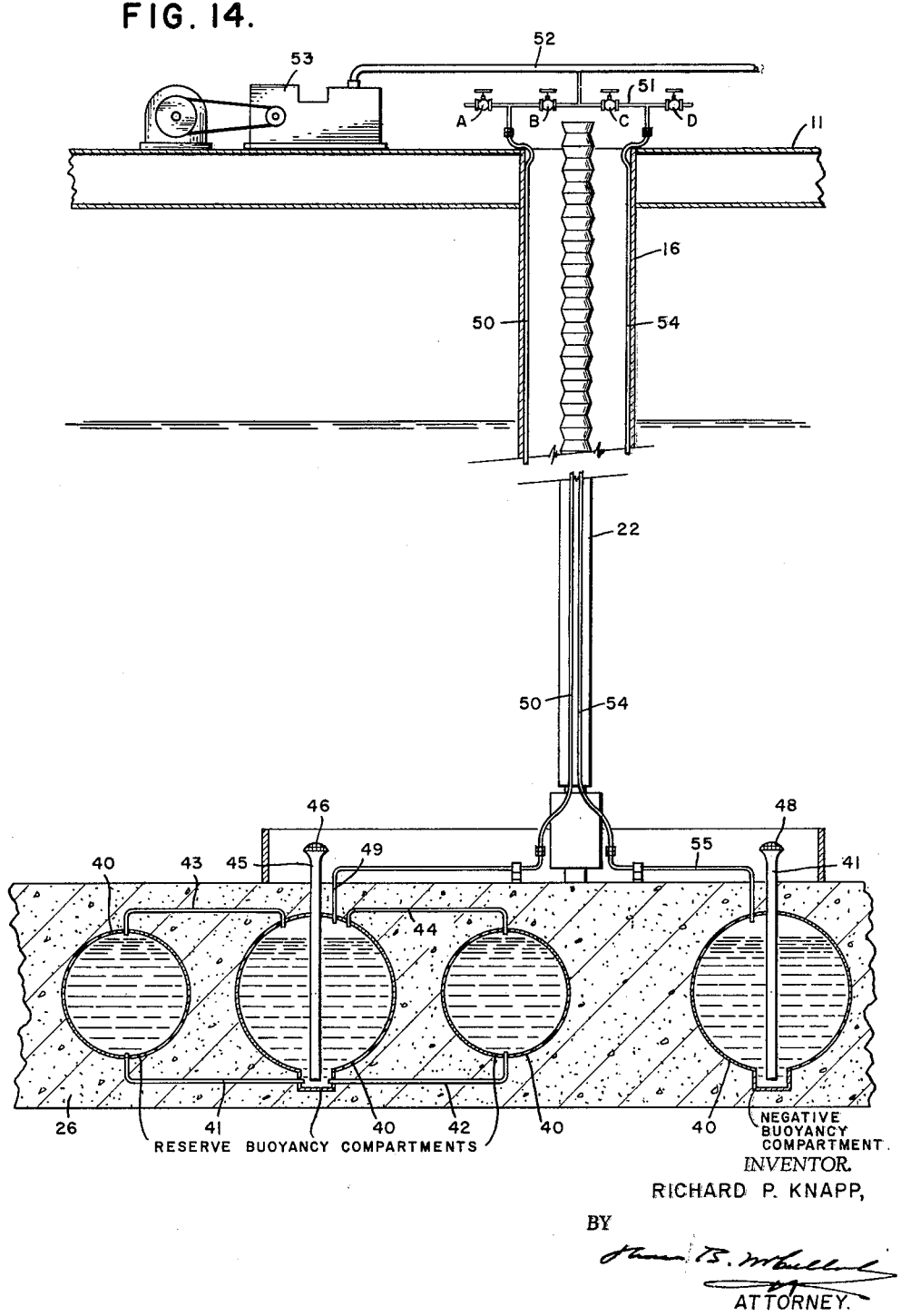

Oct. 27, 1964  R. P. KNAPP  3,154,039
STABLE FLOATING FOUNDATION
Filed July 25, 1962  8 Sheets-Sheet 7
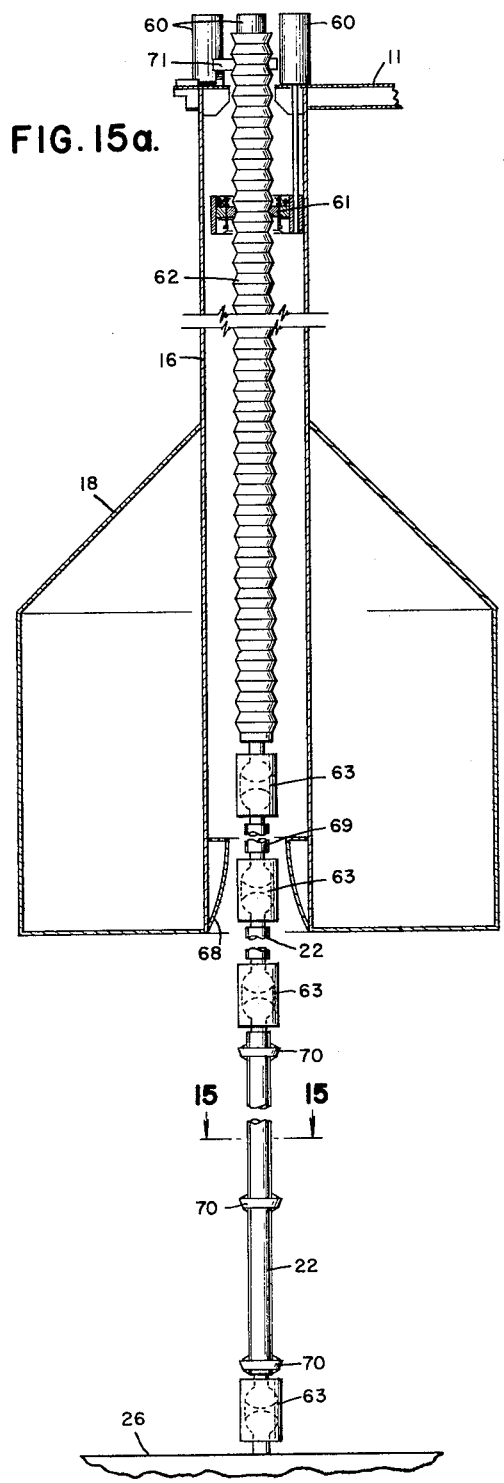
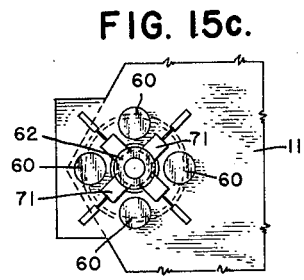
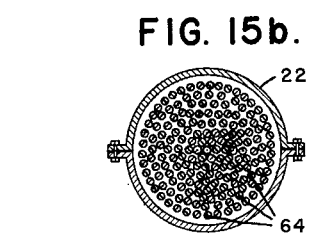
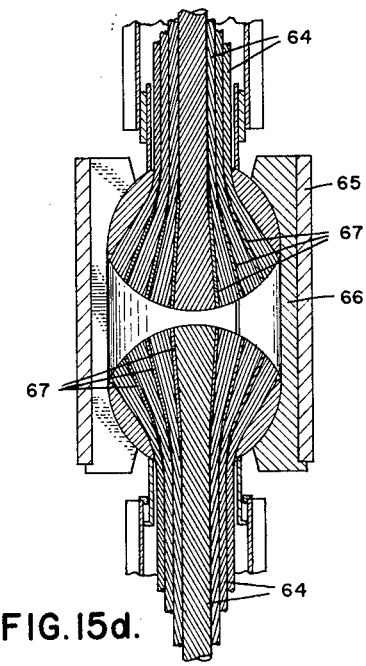
INVENTOR.
RICHARD P. KNAPP,
BY
ATTORNEY.

Oct. 27, 1964 R. P. KNAPP 3,154,039
STABLE FLOATING FOUNDATION
Filed July 25, 1962 8 Sheets-Sheet 8
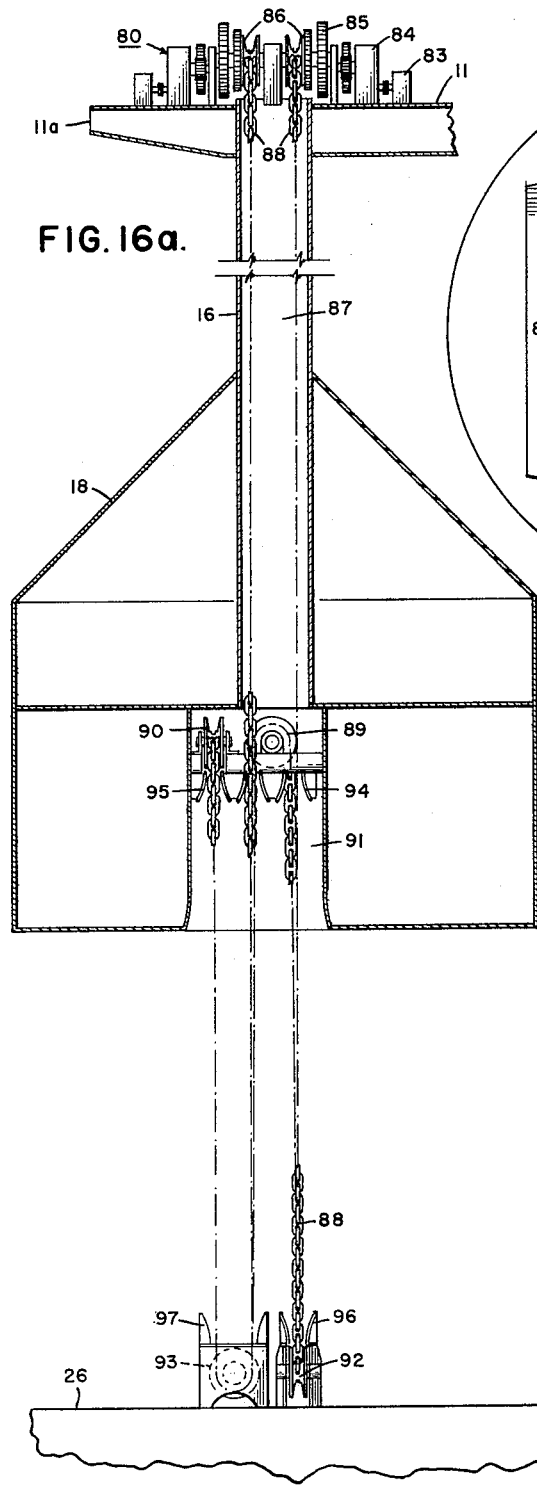
FIG. 16a.
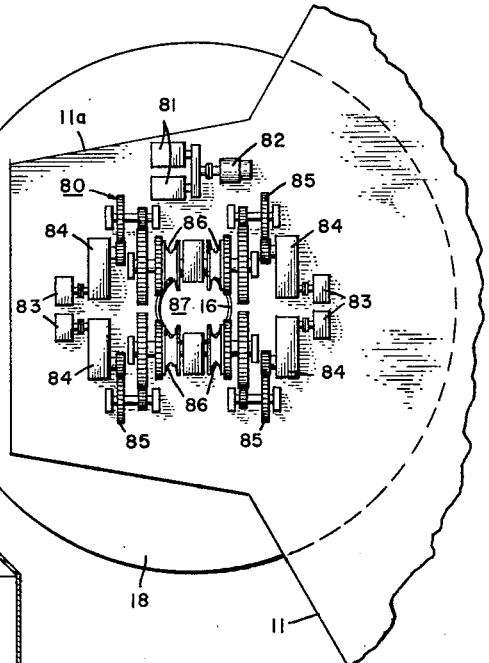
FIG. 16c.
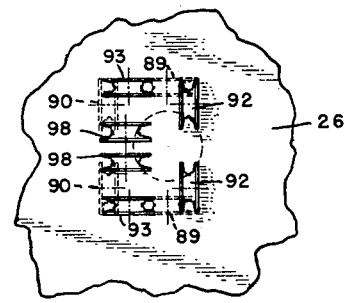
FIG. 16b.
INVENTOR.
RICHARD P. KNAPP,
BY
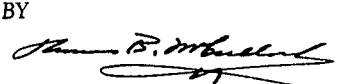
ATTORNEY.

United States Patent Office 3,154,039
Patented Oct. 27, 1964

3,154,039
STABLE FLOATING FOUNDATION
Richard P. Knapp, New Orleans, La., assignor, by mesne assignments, to Jersey Production Research Company, Tulsa, Okla., a corporation of Delaware
Filed July 25, 1962, Ser. No. 212,235
12 Claims. (Cl. 114—.5)

The present invention is directed toward a floating foundation. More particularly, the invention is concerned with a floating foundation from which drilling operations and the like may be conducted. In its more specific aspects, the invention embodies a floating foundation that remains stable and at a substantially constant angle with reference to the horizontal during periods of violent wind and wave action.

The invention may be briefly described as a floating structure or foundation comprising a platform, buoyancy means rigidly supporting the platform, and anchor means for attachment to the bottom of a body of water in which the foundation is floating. The floating structure is attached to the anchor means by a plurality of horizontally spaced-apart parallel elongated members interconnecting the structure and the anchor means. The invention employs only parallel elongated members to connect with the anchor means.

The invention also involves a method of mooring a floating foundation or structure comprising a platform and buoyancy means in which the structure is floated to a selected water location and anchored to the bottom of the water location by parallel elongated members that extend between the structure and the sea bottom at the water location.

The elongated members employed to connect the structure with the anchors are preferably flexible, and suitably may be cables of wire, chain, rods, tubes and the like.

The elongated members may suitably be an assembly of wire strand cables such as used to support suspension bridges. The anchoring cables may be made up of sections interconnected by flexible connecting means. Thus, the cables may be made up in sections of about 90 feet in length with connecting means between the various sections to provide a cable of the proper length for the depth of water in which the floating foundation is anchored. For example, a suitable cable section may comprise a group or bundle of wire lines and may have a diameter of about 12 inches or more to provide sufficient strength to maintain a large floating foundation at the water location during periods of violent wind and wave action.

A plurality of elongated members is employed which are spaced apart horizontally. To provide stability to the structure with center of gravity above center of buoyancy at least three elongated members are used to connect the buoyancy means to the anchor at horizontally spaced-apart points. It is to be emphasized that each of the elongated members connecting the buoyancy means and the anchor is arranged and always is parallel to the other elongated members.

The anchoring means employed in the practice of the present invention may suitably be a single massive structure moved to the water location and sunk to provide an anchor for the floating foundation, or the anchor means may be a plurality of anchor means depending on the needs of a particular floating foundation. The depth of water and the height of waves encountered along with the size, shape, and use of the foundation will be factors to be considered in properly sizing and designing the anchor means.

A massive anchor means may be suitably compartmented to provide only a slight negative buoyancy when the anchor means is lowered, a positive buoyancy when the anchor means is at or near the surface of the water, and greater negative buoyancy when the anchor means is resting on the sea bottom. When the anchor means is below water, a slight negative buoyancy provides a small but positive tension on the elongated members to permit control of the lowering and raising of the anchor means by a force much smaller than the maximum weight of the anchor means on bottom.

The present invention will be further illustrated by reference to the drawing in which:

FIG. 2 is a similar view to FIG. 1, showing the floating foundation moored to the water bottom during violent wave action;

FIG. 3 is a plan view of buoyancy means for the floating foundation of FIGS. 1 and 2;

FIGS. 4a to 4c inclusive are simplified views of the floating foundation, illustrating a plurality of anchor means and showing the relationship of the elongated members in wave action;

FIGS. 5 to 11 inclusive are simplified views showing a stepwise procedure for mooring and moving the foundation of the present invention;

FIG. 12a is a plan view of one anchor in accordance with the present invention;

FIG. 12b is a section taken along the lines 12—12 of FIG. 12a;

FIG. 13a is a plan view of another anchor in accordance with the present invention;

FIG. 13b is a view taken along the lines 13—13 of FIG. 13a;

FIG. 14 is a cross-sectional view of the anchor means, showing a suitable arrangement of the compartments and the auxiliary equipment for flooding and dewatering;

FIG. 15a is a view in partial cross-section, showing a detail of an elongated member suitable for interconnecting the anchor means and buoyancy means;

FIG. 15b is a view taken along the lines 15—15 of FIG. 15a;

FIG. 15c is a plan view of FIG. 15a;

FIG. 15d is an enlarged cross-sectional view of the connecting means of FIG. 15a;

FIG. 16a is view of the present invention where chain mooring is employed;

FIG. 16b is a view taken along the lines 16—16 of FIG. 16a;

FIG. 16c is a plan view of the chain handling mechanism of FIG. 16a.

Figure 1:
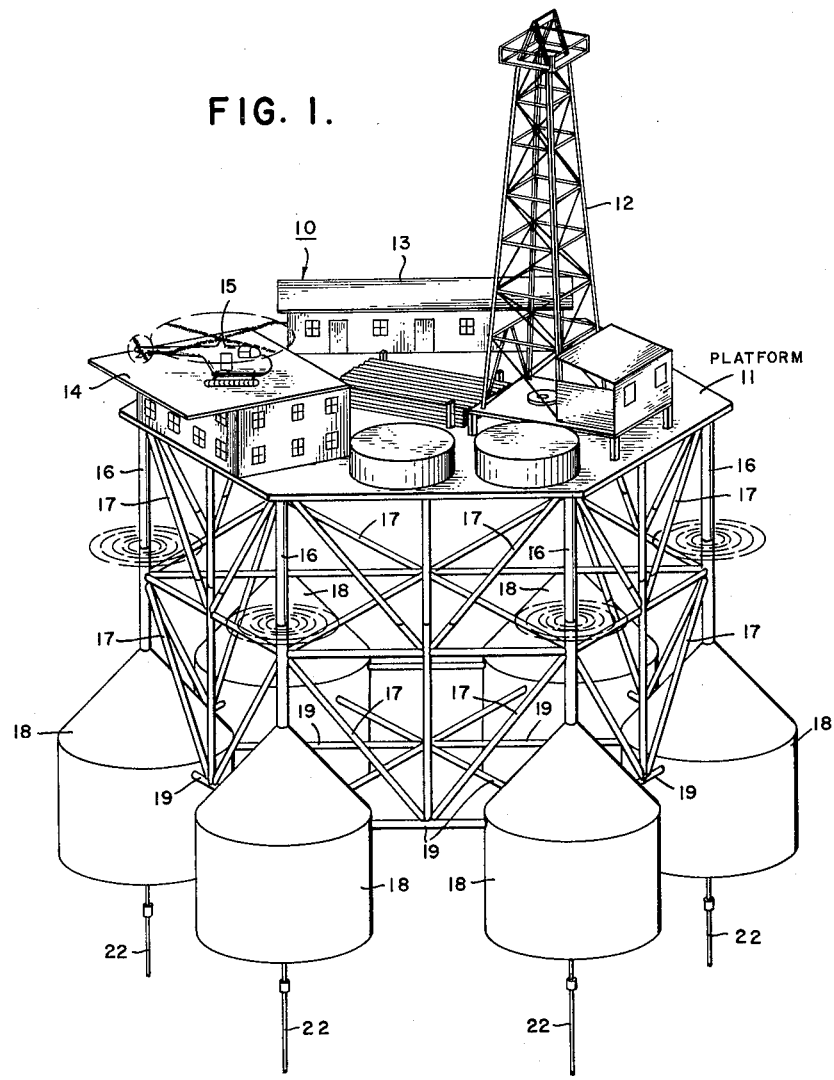
FIG. 1 is a perspective view of the floating foundation.

Referring now to the drawing in which identical numerals will be employed to identify identical parts and specifically to FIGS. 1 and 2, numeral 11 designates the platform of a floating foundation generally indicated by the numeral 10, having arranged thereon a drilling rig 12 and various housing members generally indicated by numeral 13, including auxiliary means for conducting of drilling operations. The auxiliary means 13 includes a super structure 14 on which a helicopter 15 may land. Supporting the platform 11 are vertical members 16 suitably cross-braced with members 17. The platform 11 is a polygon such as a hexagon in plan view and has on the lower ends of the members 16 and connected thereto buoyancy means 18. Horizontal members 19 suitably reinforce the buoyancy means 18.

In FIG. 2, the foundation 10 is shown floating in a body of water 20 in which waves 21 have been generated. The buoyancy means 18 are anchored to the water bottom by parallel elongated members 22 to maintain the foundation 10 at the water location and the platform 11 at a substantially constant angle with reference to the horizontal, even with the violent wave action shown. It is clear that the foundation 10 is free of any connection with water bottom other than the parallel members 22.

It is important that the parallel elongated members 22 be affixed to the buoyancy means 18 to provide stability in this type of floating foundation. A feature of a hexagonal structure such as shown in FIGS. 1 and 2, is that one or two of the elongated members 22 may part without loss of stability to the foundation. This contrasts with the lack of stability in a similar polygonal structure having three sides and only two elongated members. Thus, with the hexagonal structure, unusual stability is provided by the present invention. It is also desirable to employ a regular polygon such as one of five or six equal sides as such a structure gives a near equal presentation to wave action from any horizontal direction. Furthermore, a five or six-sided structure allows the loss of one or two of the buoyancy means without decreasing the stability such that the foundation becomes unsafe or inoperable.

Referring now to FIG. 3, the buoyancy means 18 are shown interconnected by horizontal members 19, including the horizontal members that act as cross-bracing within the hexagon. The horizontal members 19 between any two of the buoyancy means 18 may suitably be removable to allow movement of the structure on or off a well site as necessary in some drilling operations.

Thus, for example, the members designated as 19a, 19b, 19c, and 19d may be removed to allow a well or well conductor pipe location at the point W, inside the triangle enclosing the members 19a to 19d inclusive.

Referring now to FIGS. 4a to 4c, the platform 11 is supported on the buoyancy means 18 and connected thereto by the vertical members 16 and the cross-bracing members 17 and 19. It is to be noted that the buoyancy means 18 have conical members 23 and 24 on the upper and lower ends thereof respectively as these shapes have been found to minimize the force of wave action. In these figures, the buoyancy means 18 are connected to anchors 25 by elongated members 22. Noting FIG. 4a, the elongated members 22 are parallel in vertical planes. In FIG. 4b, the elongated members 22 are also in parallel planes but inclined in a direction away from the crest of a wave such as 21 that has passed the buoyancy means 18, while in FIG. 4c, the elongated members 22 are in parallel planes inclined away from the crest of an approaching wave. The difference between FIGS. 4b and 4c is that FIG. 4b shows the position after the crest of wave 21 has passed, and FIG. 4c shows the position shortly before the crest of the wave 21 reaches the structure.

It is to be noted in FIGS. 4a to 4c that the platform 11 has limited lateral movement and is maintained parallel to and at a substantially constant angle in reference to the horizontal such that the distance between the platform 11 and the water bottom decreases. Therefore, a platform remaining above the water surface requires vertical members 16 and elongated members 22 of sufficient length to maintain a sufficient distance between the underside of platform 11 and the surface of water 20 such that the crest or other elevations of the waves 21 do not reach or break over the platform 11. For example, in water where waves up to 60 feet in height may be generated, the members 16 may have a length of over 100 feet from the bottom of the platform 11 to the base of the conical member 23. A suitable length may be 104 feet.

Figure 5:
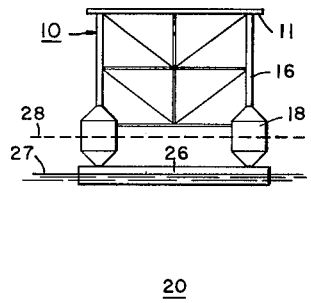

Referring now to FIGS. 5 to 11 inclusive, the foundation 10 is floated into position as shown in FIG. 5 with the anchor such as 26 comprising a single member in a floating position below the buoyancy means such as 18 which are shown in the simplified drawing. In this embodiment, the water level may be at 27 or 28 with the buoyancy means 18 and the anchor 26 in either one of the relative positions indicated. The difference between the relative positions shown with respect to the two water levels 27 and 28 is due to a variation in the positive buoyancy available in the anchor 26. Thus, a greater buoyancy in the anchor may increase the freeboard, stability, and ability of the foundation 10 to sustain flooding that might follow damage to a buoyancy compartment. The volume of the anchor is designed to provide the desired amount of weight on bottom and reserve buoyancy at the water surface. The anchor may also be shaped to minimize towing resistance as a vessel floating at the water surface.

Figure 6:
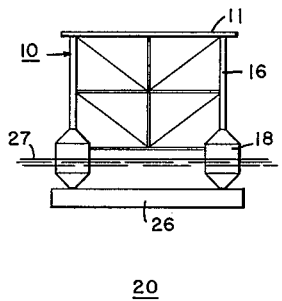

FIG. 6 also shows the foundation 10 with the platform 11 floating at the surface, but the anchor 26 is ballasted to provide only a small positive buoyancy. Thereafter, the addition of a suitable quantity of ballast to anchor 26 results in a small negative buoyancy such that there is a small net downward force on the anchor. The anchor is then supported by cables of chain, wire, rod, or tubes such as has been described heretofore.

Figure 7:
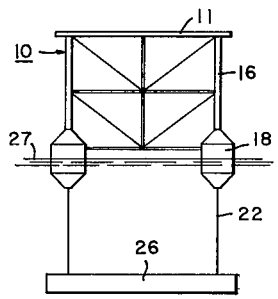

In FIG. 7, the anchor 26, with still a small negative buoyancy and a downward force, has been lowered on the elongated members 22.

Figure 8:
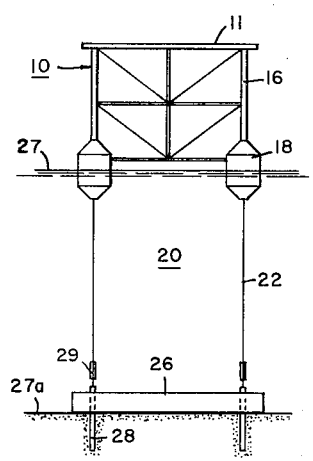

In FIG. 8, the anchor 26 is on bottom, and the buoyancy means 18 are connected by the elongated members 22 to the anchor 26. After the anchor 26 contacts the sea bottom, the anchor compartments may all be flooded to obtain a weight or net downward force suitable to preload the bottom 27a. Water jets or ballast adjustments may be employed to level the bottom position of anchor 26, and if desired, spuds such as piling 28 may be driven through suitable openings in the anchor to increase the resistance to movement of the anchor on the water bottom 27a. Other types of bottom-penetrating members, such as skirts and other protrusions from the anchor, may be employed. If the position of anchor 26 on the water bottom 27a is not substantially level, the end connections of the elongated members 22 may be adjusted in length to keep them parallel. This is suitably accomplished by adjustable connecting means such as 29 on the anchor 26. Thus, the connections 29 are always maintained in a single horizontal plane.

Figure 9:
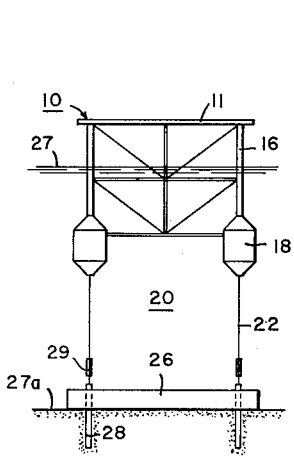

In FIG. 9, like in FIG. 8, the foundation 10 with its platform 11 is in a position suitable for conducting operations such as drilling, the difference being that in FIG. 9 the buoyancy means 18 have been pulled down on the elongated members 22 to a position below the water level 27. Ballasting the buoyancy means 18 reduces the tension in elongated members 22 and minimizes the equipment necessary to pull the buoyancy means 18 to a submerged position below the water surface 27. Thus, prior to the lowering, the buoyancy means 18 may be ballasted sufficiently to obtain any desired decrease in the buoyancy effect thereof. After the lowering, the buoyancy means 18 may be locked on the elongated members 22. Then, the buoyancy means 18 may be dewatered as necessary to support loading on platform 11, to control the natural frequency of oscillation for the foundation 10 in waves, and to equalize the tensions in elongated members 22.

To raise the buoyancy means 18, they may be again partially ballasted to lower the positive buoyancy which reduces tension on elongated members 22. Paying-out elongated members 22 then allows the buoyancy means 18 which still have sufficient buoyancy to rise to the water surface 27, where the buoyancy means 18 are further partially or completely deballasted to obtain a desired freeboard. At the water surface 27, the so deballasted buoyancy members 18 may be locked to the elongated members 22 for use of the buoyancy available to free the anchor 26, before moving to a new location with the foundation 10, as described in the discussion of FIGS. 10 and 11.

Figure 10:
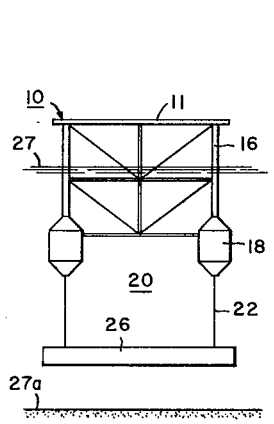
Figure 11:
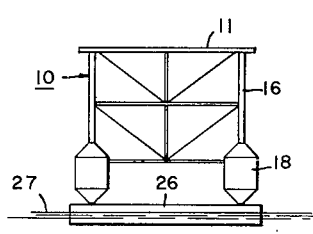

Referring to FIGS. 10 and 11, when a structure such as the foundation 10 and its attendant equipment such as the platform 11, buoyancy means 18, and anchor 26 are to be moved, any spuds such as 28 are retracted and the anchor 26 may be partially dewatered to reduce the negative buoyancy therein. A combination of ballast compartments in the anchor, as will be described further, is used for control. Jets under the anchor 26 or vents through the anchor 26 may be employed when necessary to free the anchor from adhesion to the sea bottom 27a. The anchor 26 with suitable negative buoyancy is then hoisted off the sea bottom 27a, such as shown in FIG. 10, and maintained in that position for short moves to other water locations. In this situation, the anchor 26 may be raised only the amount necessary to clear the sea bottom 27a and any obstacles. On arrival at the new selected location, the procedure described with respect to FIGS. 7 and 9 is used again.

In respect to FIG. 11, the anchor 26 is raised to a position such as shown in FIGS. 5 and 11 to contact the underside of the buoyancy means 18. The anchor 26 may be suitably connected to the buoyancy means 18 for a long move, such as one of several miles. On long moves, the anchor 26 may be provided with a positive buoyancy by deballasting as necessary.

Referring now to FIGS. 12a and 12b, an anchor such as 26 may be in the form of a hexagon with a thicker section 30 at the center thereof and having a wedge-shaped section removed to provide access for drilling and other underwater operations. For example, access to a well site is provided by the removal of the wedge-shaped section and allows the well site W to be located. Thus, the anchor 26 may be moved on and off the well site as desired by providing the opening 31. In FIG. 12b, it will be noted that the anchor 26 is suitably constructed of concrete or other cementitious material and may be suitably weighted as desired. The concrete may be reinforced with reinforcing means 32 which may also provide compartments for increasing or decreasing buoyancy of the anchor 26. The anchor such as 26 as shown in FIGS. 12a and 12b may be of sufficient size and weight to provide stability for a large foundation such as 10 and may have a side 133 feet in length. The anchor 26 will be suitably sized and shaped to conform to the size and shape of the foundation 10 and the weight needed on bottom and volume needed for buoyancy adjustments. Thus, if the foundation 10 is in the form of a pentagon or hexagon, the anchor 26 may be shaped similarly. It may be desirable to have the anchor 26 larger or smaller in area than the foundation 10. The anchor 26 is provided with connecting means or points 33 or extensions for connection to the buoyancy means 18 as shown in FIG. 2.

Referring now to FIGS. 13a and 13b, an anchor 26 is in the form of a cross-shaped member with arms 34. In this particular instance as shown in FIG. 13b, the concrete is suitably provided with compartments, such as 35 and 35a for ballasting. An opening 36 may be provided through the member 26 for conducting drilling operations. Like the embodiment shown in FIGS. 12a and 12b, means or points 33 are provided for attaching the buoyancy means 18 thereto. In this particular embodiment, the well W may be located within two of the arms 34 or may be located in the opening 36 as shown.

Referring now to FIG. 14, an anchor such as 26 illustrated in FIGS. 12a and 12b or 13a or 13b, may be provided with a plurality of buoyancy compartments 40 which may suitably be divided into reserve buoyancy compartments and negative buoyancy compartments as desired. For ease in handling and maximizing the use of natural forces, it is necessary to have at least two compartments with one for reserve and one for negative buoyancy. In the specific embodiment shown in FIG. 14, three compartments are shown interconnecting as reserve buoyancy compartments and a further compartment is shown as a negative buoyancy compartment. There may be a plurality of a greater number of compartments. The reserve buoyancy compartments as designated are interconnected by lines 41 and 42 at the bottom thereof and by lines 43 and 44 at the top thereof. The larger reserve buoyancy compartment is provided with a loading and unloading line 45 and is provided with a screen 46 to prevent ingress of foreign material. The negative buoyancy compartment likewise has a loading and unloading line 47 and is provided with a screen 48 to prevent ingress of foreign material. Connected into the top of the largest reserve buoyancy compartment is a line 49 which suitably connects through a flexible connection 50 to a manifold 51 on the platform 11 or other control station and which manifold is provided with valves A, B, C, and D and to a source of air under pressure through line 52 connecting to compressors 53. The manifold 51 connects by a flexible line 54 to line 55 which connects to the negative buoyancy compartment 40.

In lowering the anchor from a floating position, the valves A, B, C, and D are closed. The anchor is then ballasted to obtain a small negative buoyancy with valves A and C closed and valves B and D open. Thus, in lowering the anchor, valves A and C are closed and B and D are open, thus flooding the negative buoyancy compartment and keeping reserve buoyancy compartments dewatered to obtain a small negative buoyancy. After the anchor is set on bottom, valves A and D are open and B and C are closed to flood reserve buoyancy compartments and obtain a large weight on bottom. In raising the anchor, it is deballasted to provide a small negative buoyancy with valves A and C closed and valves B and D open. These valves are in the same position during the raising operation. When the anchor 26 is in the position shown in FIGS. 11 and 5 against the buoyancy means 18, the valves A and D are closed and B and C are open. It is to be noted that in moving to a distant site, the vent lines 50 and 54 would be capped.

Line 49 is provided with connections to other compartments and, likewise, the line 55 is provided with connections to other compartments. This also holds true for line 52.

Referring now to FIGS. 15a to 15d, arranged on the platform 11 are hydraulic cylinders 60 which operate jacking clamps 61, working against the jacking columns 62 which are connected to the elongated member 22, as will be described further. The jacking column 62 is within the vertical member 16 which, in turn, is connected to the buoyancy means 18. In the embodiment shown in FIG. 15a, the jacking column 62 connects by connecting fixture 63 to the elongated member 22 made up of a plurality of wire strands 64. The connecting means 63 as shown in FIG. 15d is comprised of a solid cylinder 65, a split cylinder 66, and annular rings 67, the wire lines 64 being held in place by annular rings 67. It is to be noted that the elongated member 22 is suitably sectionalized and connected by flexible connecting means 63 to provide the desired length. The sections will be made up of suitable length to compensate for the variations of water depth. In a specific example, the outside diameter of one of the cables shown in FIGS. 15a to 15d may be 15 inches with the diameter of individual wire strands being a fraction of an inch. Such sizes are necessary in anchoring the foundation, such as has been described here. Thus, the particular size given will anchor a structure supporting drilling equipment having a weight of 5,000 tons in waves of 50 to 60 feet in height. It will be noted that grip rings, such as 70, are provided and deck clamps 71 which engage with the grip rings 70 when various sections are added to the elongated member 22.

Buoyancy means 18 is provided with an opening 68 which has a radius of curvature which limits the bending of the flexible elongated member 22 such that its yield point is not exceeded. In some instances it may be desirable to provide a flexible shaft 69 which may be similarly constructed to the connecting means 63 and may be formed of a group of flexible connections 63. In the embodiment as described in FIGS. 15a to 15d, it may be desirable to provide a shock absorber to dampen any shock between the anchor 26 and the buoyancy means 18. For example, in the embodiment 15a to 15d, a shock absorber may be connected to the deck clamp 71.

While a specific embodiment has been shown in FIGS. 15a to 15d of an elongated member having flexible connections thereto, other elongated members such as chains may be used. The specific lifting equipment shown will be suitable where elongated members 22 of the type of rods, tubular members and wire strands, as described in FIGS. 15a to 15d, are used. When chains are employed, other known lifting means may be used.

With reference now to FIGS. 16a to 16d, there is arranged on platform 11 an operating mechanism generally indicated by numeral 80 comprising pumps 81 driven by an electric motor 82, the pumps 81 being suitably connected by piping to hydraulic motors 83 which are operatively connected to driving means 84 which are suitably connected by reducing gears 85 to drive sheaves 86. The mechanism 80 may be suitably located on an extension 11a of the platform 11. The buoyancy means 18 is connected to platform 11 by vertical members 16; the buoyancy means 18 is provided with an opening 87 through which chain 88 is run to interconnect the buoyancy means 18 and anchor 26 and to lower anchor 26. Thus, chain 88 is the elongated member 22 of the other figures of the drawing.

Chain 88 connects to buoyancy means 18 through idler sheaves 89 and 90 in a well 91 in buoyancy means 18 and extend from drive sheave 86 to sheave 92 on anchor 26 and thence over sheave 89 on buoyancy means 18, over sheave 93 on anchor 26, back up and over sheave 90 in well 91 down and over sheave 98 on anchor 26, and thence upwardly through elongated member 16 to a drive sheave 86. The sheaves 89 and 90 and 92 and 93 are guided by bellmouths 94 and 95 and 96 and 97 forming part of the structure of buoyancy means 18 and anchor 26. In FIG. 16b the sheaves 89 and 90 are shown in dashed lines to indicate their relative positions with respect to sheaves 92, 93 and 98 on anchor 26.

In FIG. 16a the anchor 26 is shown in the lowered position. When the anchor 26 is in the raised position the sheave structure on anchor 26 is located within the well 91.

In employing chain as the parallel elongated members, the same technique is employed as described with respect to FIGS. 5 to 11, inclusive. As stated before with respect to using wire cables, shock absorbers may also be employed with the chain. These shock absorbers may also be used to eliminate any possibility of chain slackening. For example, the idler sheaves in the idler sheaves 89 and 90 may be connected to piston rods from hydropneumatic cylinders. Sheaves 89 and 90 may be arranged to move vertically in guide rails (not shown). If the chains tend to slacken, the pistons and sheaves would be forced to rise by applying pressure, thus keeping the chains taut.

The present invention, including a floating foundation as has been described, is quite important and useful. The floating foundation may be used for supporting any sort of operation conducted at a water location. By way of illustration only and not by way of limitation, the floating foundation may be used for navigational aids, for exploring submerged locations for minerals such as sulphur and hydrocarbons, including oil and gas, for producing minerals, for supporting storage, as landing decks for aircraft, as supports for radar installations, and as launching platforms for missiles. In short, the floating foundation may be used for any purpose that a foundation on land may be used. The invention is quite important in that for the first time it is now possible to provide a stable platform which is floating without tilting due to wind and/or wave action and which remains at a fixed angle relative to the horizontal regardless of the velocity of the wind or the force of the waves, provided the structure is suitably designed for the waves to be encountered at the particular location. The present invention is also useful in water locations where the water is running swiftly with a strong current. The floating foundation, as described herein, will not tip where swift currents are encountered.

Another great advantage inuring to the foundation of the present invention is that any one of the several buoyancy means may be removed for repair without greatly decreasing the stability of the floating foundation. Thus, if one of the buoyancy means should be damaged due to collision or other reasons, that damaged buoyancy means may be removed and/or replaced or taken to shore for repair. The device of the present invention is of such size that no existing dry dock can handle or service the complete structure, and, therefore, it is necessary that the several buoyancy means be removable for proper service and repair as may be required. As exemplary only of the size of the buoyancy means, the buoyancy means 18 may have a radius of 50 feet with a platform having each side of the hexagon about 130 feet in length.

While the invention has been described with respect to particular anchors, the invention may be practiced with other anchors. For example, the floating foundation may be anchored by parallel elongated members to pipes which have been sunk in the water bottom. Thus, pipes which may have been placed in a hole drilled in the water bottom or pipes may be driven in the water bottom may serve as the anchor to which the parallel elongated members may be connected. It is possible and may sometimes be desirable to connect the parallel elongated members to anchors which have been explosively driven into the water bottom to provide for a secure connection for the parallel elongated members. In short, it is contemplated that the present invention is not limited to the specific anchor illustrated, which may or may not be buoyant, but is applicable to other anchor means. Thus, in accordance with the present invention, the floating foundation must be anchored only by parallel elongated members which extend from the water bottom to the floating foundation to provide the necessary stability.

In the present invention, a well may be drilled from the floating foundation at or near the center of floatation which provides for stability to the structure. By using a regular polygonal shape, improved stability is achieved. The structure is mobile, yet stable. By employing an equilateral pattern for the buoyancy means, maximum utility for the stability required is achieved.

The employment of a small negative buoyancy in the anchor also allows the obtaining of particularly desirable results in that the anchor may be lowered and raised under control at all times. Heretofore, there was no control in raising a dewatered sunken vessel. This feature is of particular utility in moving any sunken vessel or body.

Ordinarily, in ballasting the anchor described in the several figures of the drawing, sea water may be used. However, it may be desirable to use liquids of greater weight than sea water. For example, it is contemplated that drilling mud may be use as a ballast to which various weighting agents may be added. For example, weighting agents are known, such as gangue or speiss, which will confer weights of over 30 pounds per gallon to liquids to which they are added. Thus, in accordance with the present invention, there may be used as ballasting agents all additives which are known to be used with drilling mud to confer weight thereto.

The nature and objects of the present invention having been completely described and illustrated and the best mode and embodiment thereof set forth, what I wish to claim as new and useful and secure by Letters Patent is:

1. A floating structure having limited lateral movement which comprises a platform, buoyancy means rigidly supporting said platform, anchor means at the bottom of a body of water in which said structure is floating, and at least three horizontally spaced apart only parallel elongated members interconnecting said buoyancy means and said anchor means whereby said platform is maintained parallel to and at a substantially constant angle with reference to the horizontal, said structure being free of any connection with water bottom other than said parallel members.

2. A structure in accordance with claim 1 in which the elongated members are flexible.

3. A structure in accordance with claim 2 in which the elongated members are cables.

4. A structure in accordance with claim 2 in which the elongated members are chains.

5. A structure in accordance with claim 1 in which the elongated members are rods.

6. A structure in accordance with claim 1 in which the elongated members are tubular.

7. A floating structure having limited lateral movement which comprises a platform, buoyancy means rigidly supporting said platform, anchor means at the bottom of a body of water in which said structure is floating, and at least three parallel and no nonparallel elongated members interconnecting said buoyancy means and said anchor means at horizontally spaced-apart points whereby said platform is maintained parallel to and at a substantially constant angle with reference to the horizontal, said structure being free of any connection with water bottom other than said parallel members.

8. A floating structure having limited lateral movement which comprises a polygonal platform, a plurality of buoyancy means spaced from and rigidly supporting said platform, anchor means shaped similarly to said platform at the bottom of a body of water in which said structure is floating, and at least three parallel and no nonparallel elongated members interconnecting said buoyancy means and said anchor means at horizontally spaced-apart points whereby said platform is maintained parallel to and at a substantially constant angle with reference to the horizontal, said structure being free of any connection with water bottom other than said parallel members.

9. A floating structure limited lateral movement which comprises a hexagonal platform, buoyancy means spaced from and rigidly supporting said platform, hexagonal anchor means at the bottom of a body of water in which said structure is floating, and at least three parallel and no nonparallel elongated members interconnecting said buoyancy means and said anchor means at horizontally spaced-apart points whereby said platform is maintained parallel to and at a substantially constant angle with reference to the horizontal, said structure being free of any connection with water bottom other than said parallel members.

10. A floating structure having limited lateral movement which comprises a platform, a plurality of buoyancy means spaced from and rigidly supporting said platform, anchor means at the bottom of a body of water in which staid structure is floating, and at least three parallel and no nonparallel elongated members interconnecting said buoyancy means and said anchor means at horizontally spaced-apart points whereby said platform is maintained parallel to and at a substantially constant angle with reference to the horizontal, said structure being free of any connection with water bottom other than said parallel members.

11. A floating structure having limited lateral movement which comprises a platform, buoyancy means spaced from and rigidly supporting said platform, compartmented anchor means at the bottom of a body of water in which said structure is floating, and at least three parallel and no non-parallel elongated members interconnecting said buoyancy means and said anchor means at horizontally spaced-apart points whereby said platform is maintained parallel to and at a substantially constant angle with reference to the horizontal, said structure being free of any connection with water bottom other than said parallel members.

12. A floating structure in accordance with claim 1 in which the anchor means is provided with adjustable buoyancy means.

References Cited in the file of this patent

UNITED STATES PATENTS

| | | |
|---|---|---|
| 2,476,309 | Lang | July 19, 1949 |
| 2,908,141 | Marsh | Oct. 13, 1959 |
| 2,939,291 | Schurman | June 7, 1960 |
| 2,972,973 | Thearle | Feb. 28, 1961 |
| 3,086,368 | Popper | Apr. 23, 1963 |

FOREIGN PATENTS

| | | |
|---|---|---|
| 866,611 | Great Britain | Apr. 26, 1961 |